(12) United States Patent
Bender et al.

(10) Patent No.: US 7,802,103 B2
(45) Date of Patent: *Sep. 21, 2010

(54) KEY SEQUENCE RHYTHM RECOGNITION SYSTEM AND METHOD

(75) Inventors: Steven S. Bender, Santa Barbara, CA (US); Howard J. Postley, Santa Barbara, CA (US)

(73) Assignee: iMagic Software, Inc., Solvang, CA (US)

(*) Notice: Subject to any disclaimer, the term of this patent is extended or adjusted under 35 U.S.C. 154(b) by 634 days.

This patent is subject to a terminal disclaimer.

(21) Appl. No.: 11/714,621

(22) Filed: Mar. 6, 2007

(65) Prior Publication Data

US 2007/0162763 A1 Jul. 12, 2007

Related U.S. Application Data

(63) Continuation of application No. 10/305,493, filed on Nov. 26, 2002, now Pat. No. 7,206,938.

(60) Provisional application No. 60/413,490, filed on Sep. 24, 2002.

(51) Int. Cl.
  G06F 21/00 (2006.01)
  G06F 7/04 (2006.01)
(52) U.S. Cl. .................... 713/182; 726/16; 726/17; 726/18; 726/19; 726/20; 726/21
(58) Field of Classification Search ............... 713/182; 726/16–21
See application file for complete search history.

(56) References Cited

U.S. PATENT DOCUMENTS

| | | | | | |
|---|---|---|---|---|---|
| 4,805,222 | A | * | 2/1989 | Young et al. | 382/115 |
| 4,856,081 | A | * | 8/1989 | Smith | 455/151.4 |
| 5,229,764 | A | * | 7/1993 | Matchett et al. | 340/5.52 |
| 5,557,686 | A | * | 9/1996 | Brown et al. | 382/115 |
| 5,813,406 | A | * | 9/1998 | Kramer et al. | 600/595 |
| 6,062,474 | A | * | 5/2000 | Kroll | 235/382 |
| 6,151,593 | A | * | 11/2000 | Cho et al. | 706/16 |
| 6,334,121 | B1 | * | 12/2001 | Primeaux et al. | 706/62 |
| 6,405,922 | B1 | * | 6/2002 | Kroll | 235/379 |
| 6,442,692 | B1 | * | 8/2002 | Zilberman | 713/184 |
| 6,507,912 | B1 | * | 1/2003 | Matyas et al. | 713/186 |
| 6,546,122 | B1 | * | 4/2003 | Russo | 382/125 |
| 6,687,375 | B1 | * | 2/2004 | Matyas et al. | 380/45 |
| 2002/0081005 | A1 | * | 6/2002 | Black | 382/124 |
| 2002/0175211 | A1 | * | 11/2002 | Dominquez et al. | 235/492 |
| 2004/0034788 | A1 | * | 2/2004 | Ross | 713/193 |

FOREIGN PATENT DOCUMENTS

EP 1085454 A2 * 3/2001

* cited by examiner

Primary Examiner—Techane J Gergiso
(74) Attorney, Agent, or Firm—Duane Morris LLP

(57) ABSTRACT

A user recognition and identification system and method is presented in which text entered by a user at a keyboard is evaluated against previously recorded keystrokes by the user for the presence of repeatable patterns that are unique to an individual.

25 Claims, 6 Drawing Sheets

| Sample 1 | Dwell t | Flight t→i | Dwell i | Flight i→g | ... | Dwell L |
|---|---|---|---|---|---|---|
| 28 | 30 | 32 | 34 | 36 | | 38 |

FIG. 2

| Sample 1 | Dwell t | Flight t→i | Dwell I | Flight i→g | | Dwell r |
|---|---|---|---|---|---|---|
| Sample 2 | Dwell t | Flight t→i | Dwell I | Flight i→g | | Dwell r |
| Sample 3 | Dwell t | Flight t→i | Dwell I | Flight i→g | | Dwell r |
| ... | ... | ... | ... | ... | | ... |
| Sample n | Dwell t | Flight t→i | Dwell I | Flight i→g | | Dwell r |

FIG. 3

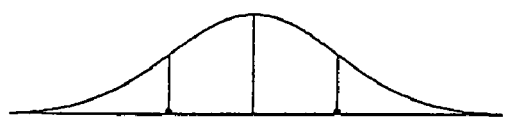
Not Acceptable
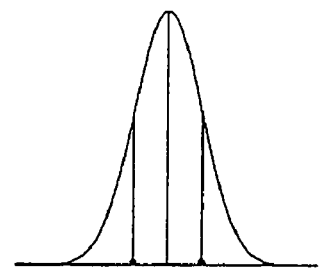
Acceptable
FIG. 4A
FIG. 4B

|  | Dwell t | Flight t→i | Dwell i | Flight i→g | ... | Dwell r |
|---|---|---|---|---|---|---|
| Sample 1 | 40 | 42 | | | | |
| Sample n | | | | | | |
| Mean M | 90 | 185 | 205 | 180 | | 200 |
| Standard Deviation δ | 44 10 | 6 | 18 | 25 | | 8 |
| 3δ in +/-10%? | 46 NO | YES | NO | NO | | YES |

| Cal Relevance Variable | Stored M | Stored δ | Sample | Distance δ | Acceptable δ | Probability |
|---|---|---|---|---|---|---|
| Flight G | 52 180ms | 54 8ms | 56 162ms | 58 2.25 | 60 3 | 62 Yes |
| Dwell T | 152ms | 5ms | 78ms | 14.8 | 3 | No |

FIG. 6

KEY SEQUENCE RHYTHM RECOGNITION SYSTEM AND METHOD

PRIORITY

This application is a continuation of U.S. application Ser. No. 10/305,493 filed Nov. 26, 2002 U.S. Pat. No. 7,206,938 which claims priority from U.S. Provisional Application No. 60/413,490 filed Sep. 24, 2002.

BACKGROUND OF THE INVENTION

1. Field of the Invention

The present invention generally relates to biometric identification, and more particularly to biometric identification of users of a keyboard system, in which a user is identified by characteristics of his/her inputting of data.

2. Background Information

People have long known about muscle-memory, and it is known that people have unique "typing" styles. In World War II, the recognized sending style of a telegrapher was called the "Fist of the Sender." Experienced Morse code operators could recognize each other by their unique styles and this was exploited to ensure message authenticity. Muscle-memory and unique typing patterns are real.

For more than twenty years, various people have tried to develop a way to recognize these unique patterns in an effort to apply them to computer security. Dr. James Young and Robert Hammon of SRI International conducted significant research, and were granted U.S. Pat. No. 4,805,222 in 1989. The technology of that patent has not been implemented. The inventors believe that the reason is that people only have these unique typing patterns under certain, well-defined circumstances. In order to find these patterns, one must understand the circumstances under which they occur. Dr. Young and Mr. Hammon looked for "global" patterns. In other words, they expected that if people simply "typed" there would be distinct and consistent patterns. The present inventors assert that these do not exist. Hence, these algorithms, while finding some effects, miss the main point and fail to provide an accurate and useable metric. Exemplary is the concept of "continuous verification." Here, Dr. Young and Mr. Hammon track a person's every keystroke (and presumptively mouse-movement) all the time. Then, each keystroke and movement is compared to the stored "template" or signature to "continuously assure" the subject's identity. In order to function at all, there must be a pattern to check. Patterns are not present in random keyboard use. These unique and predictable patterns only develop with repetition and the development of memory. Further, certain patterns are more "learned" and reliable than others are. Rather than people having a "pattern," people have a series of mini-patterns that vary in quality interspersed among various quantities of "noise." The Young patent also includes evaluating the pressure applied to a key, which is not ascertainable from a standard computer keyboard.

Many verification technologies, indeed all prior art attempting to utilize keystroke information, make the assumption that people "have" patterns and that it is just a question of looking for them somehow. There have been numerous different methods of searching for these patterns proposed, from statistics to "neural networks." Generally, a subject is asked to type, or key, a certain phrase or key sequences into a system some number of times. Then, using these samples, the prior art "looks for" or "learns" the pattern, based on whatever data was in the samples given. Nowhere is there an understanding of what constitutes a "good" sample. This is a key flaw. The present inventors assert that patterns only develop over time as people commit the sequence to memory and develop stable "muscle-memories."

In order to search for, and find, good patterns to "learn," you must know in advance what "good" patterns look like. In other words, an advance metric of quality is required. This advance knowledge is lacking in the prior art. The result is a situation where a subject can enter the key sequences using any combination of patterns, fast to slow, smooth to jumpy, and the system will "accept" these as the user's "pattern." Clearly, this in not really a stable pattern and any conclusions drawn from it will be faulty. Indeed, it is possible to introduce so much variation into the samples that no valid conclusions can be drawn, and a signature/template drawn from such a widely-varied input will have little-to-no ability to actually discriminate between people.

The present inventors correct this fatal flaw by defining, in advance, measures for pattern "goodness" or quality. Subjects are required to enter sample information repeatedly, until they exhibit sound, solid, and well-learned patterns. In the present invention, these patterns are represented by mini-rhythms, which are developed by the subject as they "learn" to type or key their information. These mini-rhythms are very stable, and are evidence that the subject has successfully "learned." Note, in the present invention it is the subject who learns, not the system. In all prior art, it was the system that "learned." In the present invention, the system establishes metrics for successful learning and then causes the subject to meet these standards. These standards can be set at various levels, from low-to-high, depending on the security need. In this manner, the learning effort required of the subject is fully commensurate with the required security of the system.

Many verification technologies use data created by entering a string of characters. They utilize the entire string thus created. The technology of the present invention does not use the entire string of information, and this is a fundamental concept of the present invention. The technology of the invention teaches that there are only certain small areas in the keystroke pattern that are reliable enough for biometric testing, especially if the use is to protect with any certainty in a high-security use. The fact is that most of the keystroke timing data is too noisy and volatile for use. Most of the time people do NOT have unique rhythms.

Therefore, any testing for these rhythms, no matter how statistically sophisticated will fall short in several material ways.

U.S. Pat. No. 4,621,334 to Garcia exemplifies the prior art approach to keyboard style recognition and security. First, Garcia has no concept of what constitutes a good pattern in the first place. Garcia simple asks a subject to type a number of samples and from that derives a pattern, whether a pattern truly exists or not. Garcia just uses any samples presented. In measuring keystroke data, Garcia uses flight time only, not the dwell time. The "database" or "electronic signature" is recorded by typing the individual's name a number of times. The time delays between each successive keystroke are recorded. These time delays include the spacing between every letter and between every space in the name of the individual. This is different from the present system, which may also utilize dwell time, and utilizes only the most statistically significant portion of the entered information. Further, Garcia will create this electronic signature from samples that are complete noise. The present invention avoids these pitfalls.

Garcia utilizes a subject's name as the test phrase. Names can be any number of characters, so this feature of Garcia indicates that phrase length is not an issue. Garcia states "(i)n practice, it has been found that the best data is derived when an individual types his own name. Apparently, the degree of familiarity and the emotional involvement of the input contribute to the stability and uniqueness of the electronic signature." The present inventors assert that rhythms develop only after successful learning has taken place. This is the explanation for why Garcia found better results using the subject's name; it is familiar and often typed and therefore often more learned. However, using the subject's name is no guarantee of a good signature. Some subjects have not typed their name often. In addition, some subjects may actively cheat or introduce purposeful variability. Using a familiar phrase will improve results in the Garcia method if the subject cooperates and if the subject has already typed his/her name often enough to generate a reasonably consistent pattern. However, this is no substitute for establishing standards of signature quality in the first place, as is done in the present system. In addition, the present inventors assert that the phrase length is a major issue. In the present invention, a longer phrase length results in a greater number of qualified mini-rhythms when successful learning has taken place. The greater the number of qualified mini-rhythms present, the greater the system's ability to discriminate between the "real" subject and an imposter. Additionally, the greater the number of qualified mini-rhythms present, the easier it is for the real user to meet the enrollment standards (measures of signature goodness) required when security standards are set at a high level. In the present system, a subject could use a phrase as small as four characters, like a PIN, and the system would provide significant discrimination for a low-value transaction. In a high-value or mission-critical high security environment a phrase length of 15-20 or more might be selected. The higher phrase length would result in greater discrimination, and much less chance of an imposter successfully penetrating the system.

In Garcia, a single number test is utilized. After repeated entries, a mean time is found for each flight time variable. The resulting means, or averages, are them themselves averaged. The result is a single deterministic number. This is used as the pass/fail threshold. Quoting from Garcia, "(i)f an entry by an authorized individual has a Mahalanobis distance function value of 50 or less, he can be immediately authorized. In contrast, if the Mahalanobis distance function value is greater than 100, he should be rejected." This means that the entire sequence from the first letter to last is being used. Unfortunately, there is no consistent pattern across the entire phrase. Most keystroke typing patterns in the sequence are too variable for practical use. Therefore, Garcia teaches away from the selective use of only the most statistically relevant values, which is one of the core tenets of the technology of the invention. Further, the concept of a "single number," "pass/fail" system is inherently weak as it introduces the certainty of mistakes. A real subject will often be "rejected" while an imposter might often be "accepted." When you consider the averaging of averages of data that is largely invalid in the first place, it is clear errors are the norm under Garcia's method.

By contrast, the present invention 1) only allows good samples; 2) identifies the stable mini-rhythm portions of the samples; and 3) returns a "risk measure" via a number on a granular scale based on the number of mini-rhythms in the sample. This risk measure is more sensitive and useful than the Pass/Fail measure of Garcia, and other similar prior art. The present technology eliminates the fundamental errors found in Garcia and the prior art by accurately measuring just the "real" pattern against a granular scale. In addition, the present invention provides more and more useful information than contained in a single Pass/Fail metric. The present invention identifies "transactions at risk" and provides detail on the "degree" of risk. These metrics may trigger alerts, silent or overt, or trigger other events like additional system challenges or phone calls on a selective basis depending on the "degree." For instance, in the present invention, a subject may have twenty mini-rhythms detected and recorded for a particular phrase. A subject may, under normal conditions, be expected to exhibit 18-20 of his/her mini-rhythms on any given verification attempt. An administrator using the present system might set different actions to trigger depending on the range: 0-10, 11-15, 16-18, and 18-20 for instance. This granular "risk" output is unique to the present system and adds significant value.

Garcia asserts that it is possible, using his technique, to recognize random typing patterns. This is impossible. This is because the "patterns" he is looking for do not in fact exist. This is an insurmountable problem that is fundamental to Garcia and other prior art. Garcia believes that humans have patterns that exist in all typing and all one has to do is find them statistically. It has been assumed that the pattern recognition database of Garcia will be generated from multiple entries of a unique password, and access to the system is obtained by entering the same password. This approach can be referred to as simple discrimination.

A more intricate approach can be implemented and is characterized as complex discrimination, or complex signature. Complex discrimination is based not on a typing pattern derived from a specific message, but on a mathematical model that predicts a priori—a person's typing pattern for any given message, even if it never has been typed before. In order to utilize the complex signature, it would be necessary for the individual to type out at least 1,000 of the most common words in the English language. The words would be presented in a series of constrained phrases, typically generated randomly by a parser program that assures that verbs, nouns, adjectives, and prepositions are in correct, grammatical order. Over the years, people have tried this method, and have found it to be unworkable. Some correlations may be found which are statistically valid. However, these do not work out in practice as real users have far too many variations in typing timing. In other words, the variations are so numerous that they really have no patterns in the first place, except in certain non-typical circumstances. The result is frustration for the real user from frequent rejection, and poor security value as the imposter is often accepted. People do not have "universal," "all-the-time" patterns. Rather people have "some" patterns, "some" of the time. The present invention illuminates what these patterns are, specifies when they exist, and recognizes them when it sees them. The present invention is the first system that formally does any of these things.

Smith, U.S. Pat. No. 5,721,765, is for a personal identification number system. Although Smith used keystrokes and groups the keystrokes together, Smith is not similar to the technology of the present invention. What Smith does is 1) break the PIN up into "bank-assigned" groups; and 2) tells the subject to enter the numbers in these groups. Essentially this is making the "group pauses" a part of the password. Thus, the true subject must have "secret knowledge" and his style of entering the numbers is not a biometric per se. A password is a form of secret knowledge in which no one but the subject supposedly knows the password. The disadvantages of using a password security system are the reason a security system based on a biometric is desirable. A password can be stolen, copied, guessed, or coerced. A true biometric resides within the individual and cannot be lost, copied, or stolen. Clearly, anyone knowing where the "pauses" go could successfully masquerade as the real user. In essence, Smith has described a variation on a password system and does not have a biometric at all.

Brown et al., U.S. Pat. No. 5,557,686, is a method and apparatus for verification of a computer user's identification based on keystroke characteristics. This patent is very similar to the Smith patent. The "purifying" mentioned is to eliminate "outliers" during sample collection, with the idea being that you only want a "signature" based on good samples. This is a good idea. You do want to have a good signature. However, Brown does not define what constitutes "good." Brown takes all the samples given, with whatever variation is present, and tries to find the patterns whether there or not. The concept of "outliers" therefore just means samples that are "really" different from some overall averages. Again the entire sample set may be bogus and lacking in real patterns either because the real user has not yet developed solid patterns, or because of intentional sabotage. Brown's system is still "garbage in/garbage out" and, though improved via the provision for outliers, still devoid of the concept of quantifiable standards of sample quality in the development of signatures. Brown assumes people "have" patterns when they do not. People develop patterns. Brown does not understand this, and like all similar prior art, is fatally flawed.

In addition, Brown looks at the entire "signal." This means from the first key down to the last key, up as a gestalt sample. A neural network then looks for patterns in the signal. No matter how well a neural network, or in fact any recognition technology, works it is fundamentally dependent on having good start patterns. Brown does not specify what good is and therefore cannot recognize it, regardless of the sophistication of his techniques. This fatal flaw renders the system practically useless as a human recognition system, and certainly useless in any high-security environment.

The technology of the present invention also eliminates outliers, but only for the subject's convenience. Outliers (atypical samples) "mask" the mini-rhythms sought by the present technology, which may otherwise be developing nicely, and causes the subject to enter more samples than would be necessary if the outliers were eliminated. The present technology defines "goodness" based on defined statistical qualities, not overall signal matches. No amount of filtering by the neural net of Brown can compensate for the problem of perceiving good samples from a large volume of bad samples, and actually teaches away from identifying the mini-rhythms from within the sample. You must have good samples to start with, or everything done thereafter is useless. Brown's neural network looks for patterns in the noise, whether there are real patterns present or not. The present invention insists on good start samples, articulates where the real patterns are, and finds them.

Brown discusses a "threshold of similarity," but again Brown considers the entire signal as an entity. This includes much noise, to the point of making the technology useless for any high security application. For any application where the real user is routinely able to gain access, the informed intruder would also get in easily. In other words, a determined, skilled, and informed imposter will be able to defeat or "spoof" the security system of Brown.

This is not so with the mini-rhythms approach of the present invention. The mini-rhythms are highly reliable because the real user almost always does them, whether being tested or not. The mini-rhythms are scattered throughout the selected sample phrase. Even the real user does not know where they are. A determined, skilled, and informed imposter will have to hit every variable exactly (something even the real user cannot do) to be sure of hitting the mini-rhythms buried in there somewhere. This is another fundamental difference between Brown and the present invention. The present invention overcomes the fatal problems present in Brown's strategy and represents a fundamentally different approach, and yields a correct solution 100% of the time.

Primeaux et al., U.S. Pat. No. 6,334,121, is for a "usage pattern based user authenticator." Primeaux strictly looks at usage patterns, which is similar to what banks and credit card companies have been doing for years. If a centegenarian widow goes to a stereo store to buys a $5,000 stereo, she will get a call to verify that it was really her using her card, because she does not usually by $5,000 stereos, but credit card thieves do.

Cho et al., U.S. Pat. No. 6,151,593, is for an apparatus for authenticating an individual based on a typing pattern and using a neural network system to analyze the typing pattern. Cho does not use the mini-rhythm concept. Instead, they use the neural net to look at the gestalt pattern of the typing sample. This approach is quite a different concept than the mini-rhythms technology. Essentially, the neural network is a "pattern finder" and a method of discerning patterns within a noisy input set. As such, it depends on the assumption that there are patterns in the first place. Unfortunately, this is not always the case. Indeed, it is not even usually the case. The present inventors teach that patterns only develop after successful learning has taken place. People do not have "native" patterns. Further, people learn at different rates. Cho simply accepts whatever samples are given without discrimination, relying on the neural network to sort out the "noise." This will only work in those situations where 1) the subject has already learned stable patterns; 2) the subject is actively cooperating; and 3) the subject displays these patterns in consistent enough manner to "break through" the noise that is also present. This results in a system that will somewhat work, some of the time. In contrast, the present invention overcomes these fatal and systemic problems and generates signatures and recognition systems that work 100% of the time.

Cho is also a Pass/Fail system. The technology of the present invention looks at mini-rhythms as being "warning bells." If there are ten mini-rhythms in the sample text, for example, it might be "normal" for the real user to miss 0, 1 or 2. That level of success might be called "Green." As more mini-rhythms are missed, and more "bells" go off, the certainty develops that there is a "real-time" problem. The "real-time" is important. Actually it is more important (in many cases) to "catch" the intruder than to "stop" them, which a system running mini-rhythms can accomplish.

Cho et al. is subject to all the criticisms given earlier with respect to the similar systems of Brown and Garcia. The concept of "garbage in/garbage out" still applies. The flaws are fundamental and fatal. The solutions to these problems are significant components of the present invention.

Kroll, U.S. Pat. No. 6,062,174, is an "ATM signature security system." Kroll is a patent directed strictly to ATMs. Like other prior art, Kroll looks at the entire sample in combination with the type of ATM machine to determine acceptability. It does not require the subject to develop mini-rhythms, and does not analyze the sample for qualified mini-rhythms.

Kroll, U.S. Pat. No. 6,405,922, is for a "Keyboard signature security system." It is very similar to the Kroll'174 patent, and similarly does not use mini-rhythms. Kroll '922 discusses subject ATM usage patterns that are germane to ATM devices only and are not a part of keystroke recognition at all. Kroll does mention both Flight Time and Dwell, where other prior art generally looks only at Flight Time. However, it does not utilize mini-rhythms. Also absent are measures of signature quality. Kroll retains all the problems of the prior art mentioned with respect to Garcia, Brown and Cho, and others. Kroll does add the idea of keeping track of "which" keyboard the subject is using and "adjusting" for differences between keyboards. While this is perhaps useful information for ATM devices in particular, it does not advance the state-of-art in keyboard recognition via typing patterns. Kroll is based on fundamentally flawed techniques for keystroke recognition. The other additions made by the Kroll method, such as "device location," target ATM devices specifically, and do not address the typing recognition problem at all.

SUMMARY OF THE INVENTION

The technology of the present invention overcomes the problems found in the prior art and discloses a method for providing security to keyboard based systems. The method involves recognizing the patterns of typing by a subject using the system in which the subject's identity is confirmed.

The first step in this method is defining at least one statistical relevance criterion that will qualify certain keystrokes in a group of keystrokes typed by the subject as what will be described as a "mini-rhythm." The statistical relevance criteria can be chosen from a number of criteria, including mean, standard deviation, qualified margin, number of fits, and other criteria.

The next step in the method is the step of requiring the subject to enter an enrollment phase. During the enrollment phase, the subject enters sample text at a keyboard. The sample text could take the form of text that the subject normally enters during his work over a certain period of time. The period of time and the amount of text in this situation would be governed by how soon mini-rhythms were detected and qualified using the selected statistical relevance criteria.

Another type of sample text that could be used in the enrollment phase could be text that is selected by someone other than the user. It is possible that in a later validation phase, the text used to validate the user's identity would be different from the text entered in the enrollment phase, or it could be the same as the enrollment test.

A third scenario is to require the user to enter in a selected phrase with a predetermined number of characters. The user would use this identical phrase in a later validation step in which his/her identity is evaluated by the repeatability of the mini-rhythms in the phrase exhibited and identified in the enrollment phase.

The next step that occurs while the subject is typing text at a keyboard during the enrollment phase is that certain characteristics of the keystroke actions are sensed and stored. Typical actions that are sensed and stored include the dwell time, flight time, and, optionally, the physical key depressed. All of these characteristics of the keystroke actions are stored in memory.

The next step is analyzing the sample text keystroke characteristic data against the previously listed statistical relevance criteria to identify if one or more groupings of characters in the sample text keystroke pattern qualify as mini-rhythms. The groupings of sample text keystroke patterns can involve more than one character, and can be associated with more than two characters, such as four or five characters.

When these groupings of sample text keystroke actions are identified as mini-rhythms, the mini-rhythms are stored in memory as identified mini-rhythms. These serve as stable "markers" and are unique to the subject. Sample text keystroke characteristic data not identified as part of a mini-rhythm is not used in the statistical analysis.

The next step involves defining the criteria for acceptance of mini-rhythm recognition during a validation phase. The subject is required to enter a validation phase at a later time in which the subject enters text by a keyboard, such as a computer keyboard. By entering the text, a number of validation text keystroke characteristic data are created and sensed. The characteristics presented are matched against the expected identified mini-rhythms. Depending of the sufficiency of this correlation, an acceptance rating is developed, which is indicative of the degree of recognition between the validation phase mini-rhythms and the enrollment phase mini-rhythms.

Another version of the method of the invention is a method for providing security to keyboard based systems that begin by defining at least one statistical relevance criterion that will qualify certain keystrokes in a group of keystrokes typed by a subject as a mini-rhythm. This method includes a learning phase, as well as an enrollment phase.

In the learning phase, the subject enters sample text at a keyboard. The sample text can be a variety of text selections, which are typically chosen by someone other than the user. The sample text can be of various lengths, but a minimum of four characters is required, with an optimal being twelve or more characters. At least one criterion is defined to indicate when text entered by the user in the learning phase qualifies as meeting the learning phase requirements, that it qualifies as showing successful "learning," meaning the presence of mini-rhythms. As the subject enters text at the keyboard during the learning phase, characteristics of the keystroke actions are sensed and recorded. The characteristics that are sensed can include dwell time, flight time, and optionally the physical key that was depressed. The sample text keystroke characteristic data are compared against the chosen statistical relevance criteria to identify mini-rhythms. The mini-rhythms are evaluated to see if the sample text meets the learning phase requirements criteria. The learning phase requirements criteria would typically include a chosen amount of variance. The purpose of the learning phase is to allow the subject to get familiar with the phrase to be typed/keyed and to do the initial learning. The learning phase measures the progress of this learning and provides feedback to the subject. This allows the user to begin the enrollment phase with a developed pattern, and makes the enrollment process shorter and easier.

Next, the user enters an enrollment phase in which the same sample text is entered, and the presence of mini-rhythm are verified. Before entering the enrollment phase, criteria for acceptance of the enrollment phase mini-rhythms are established. The enrollment phase mini-rhythms are stored in memory as identified mini-rhythms. These are unique to the subject, and are stored for later comparison with validation phase keystroke samples.

Of the text string entered, only certain sections of the keystroke pattern will qualify as mini-rhythms. The data on the keystrokes not qualifying as mini-rhythms are not used for identification, and are typically not stored, but optionally may be stored as part of the data.

The next step involves defining criteria for acceptance of validation mini-rhythms against the signature mini-rhythms. Once the criteria for acceptance of validation mini-rhythms are defined, the subject enters a validation phase after the enrollment phase. In the validation phase, the subject enters text typically identical to the sample text at the keyboard. The specific characteristics measured during the validation sample are compared against the enrollment mini-rhythms to return an acceptance rating that is based on the degree of recognition or the correlation between the validation phase typing sample and the enrollment phase mini-rhythms.

The keystroke characteristics that are sensed in the system include the key up and key down signal, the dwell time, and flight time. The end of entering the phrase of text is typically ended when the subject presses an enter key. If the subject enters a delete key, backspace key, or other "error" key indicating that corrections are desired, the entire sample is typically discarded.

An optional feature of the system is allowing the user to define the text of the sample text. The sample text selected by the user would be evaluated to see that sufficient characters were present, and other enrollment phrase requirements are met, and if so, the user could select his/her own sample text.

In the system described above, each time the sample text is entered, a record would be created that would be stored in an array. Each record would be comprised of the key up time, key down time, dwell time, and flight time of each character in the sample text. Each instance of entering the sample text would result in a record being stored in the array in memory, with columns in the array representing flight times, dwell times, key up times, key down times, and other data for each physical key depressed. Each column of the array thus created would be analyzed for mean, standard deviation, and other statistical evaluations.

The sample text could include alphanumeric characters, as well as non-alphanumeric keyboard actions, such as the control key, the right and left shift keys, the spacebar, the alt key, and combinations of these keys.

The method of providing security described above requires a minimum of four characters, with nine to fifty being a reasonable range. More than fifty characters could also be utilized, and the more characters utilized, the more mini-rhythms that could be identified, and the more sensitive the evaluation would be. An optimum number of characters is between twelve and twenty-five, which provides sufficient characters for mini-rhythm identification, and a sufficiently short number of characters for the user to learn and repeat.

One statistical relevance criterion that can be used to identify mini-rhythms is a predetermined qualifying margin. This will be discussed in later text.

Another statistical relevance criterion for use is a "predetermined number of fits," which will be further discussed.

Another statistical relevance criterion is use of a "predetermined number of qualifing variables," which will be further discussed.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

BRIEF DESCRIPTION OF THE DRAWINGS

FIG. 2 is a row of a data array for one entry of sample text.

FIG. 3 is a table of data made of rows in which each row represents one entry of sample text.

FIG. 4 is an illustration of the preferred distribution of data.

FIG. 5 is a table that shows how information in columns is evaluated.

FIG. 6 is a table showing how validation text is evaluated against sample text.

DESCRIPTION OF THE PREFERRED EMBODIMENT

Figure 1:
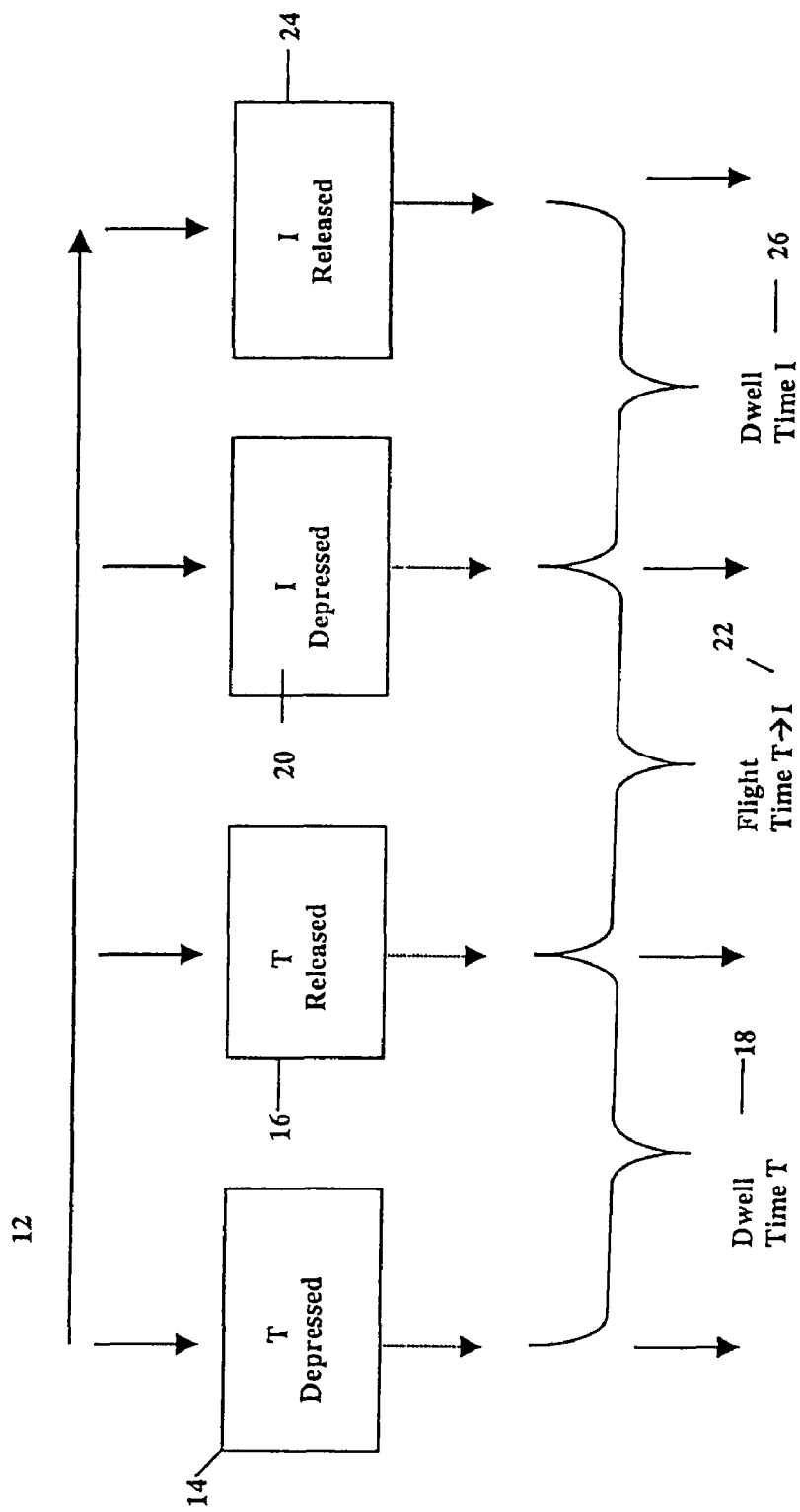
FIG. 1 is a diagram showing how dwell and flight time are calculated.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims. Furthermore, it is understood that method embodiments herein may be executed by hardware, firmware, or with a computing device with software encoded on a computer readable storage medium.

Prior art keyboard recognition systems record and utilize the entire data string produced by typing a password, a selected target phase, or random text. By trapping a large volume of noise along with the small amount of real data that "might" or "might not" be present within a sample, the overall predictive value of any technique using the entire string of keystroke activity is weakened. One of the key insights of the technology of the present invention is that people only have reliable rhythms under certain circumstances. The technology of the invention defines these circumstances rigorously. Further, what constitutes "reliable" rhythms is defined rigorously and in advance. These small areas of reliable rhythms are termed "Mini-Rhythms." The technology formalizes a technique for mini-rhythm development and recognition, and provides a mechanism to "quality assure" these mini-rhythms before they get into any "template" or "signature" created.

Further, and in stark contrast to all prior art, this technology works in high-security as well as the consumer "ATM" or "PIN" number situations. In high-security, the system looks at phrase lengths typically of fifteen or more characters. As phrase length increases, the sensitivity of mini-rhythm recognition can be increased to any level required. The claims specify keyboard based systems, and what is meant by that is, any character entry system, such as a computer keyboard, keypads, touch interfaces, telephone keypads, and all other character or touch entry systems.

The technology checks only a few (5-12 being typical) of the time variables and disregards the rest. This means that in a phrase of say twenty-five characters, where forty-eight measured variables (dwell and flight) are measured, only five to twelve of the forty-eight will typically be considered as "qualified" to be "mini-rhythms." These are the only ones that are actually tested. The rest are not utilized in statistical evaluations and may even be discarded. Thus, 75-90% of the original "signal" is noise. As the phrase length is increased, the amount of noise as a percentage of the total increases, while the quality, or statistical reliability, of the mini-rhythms used increases. The mini-rhythms of the technology become better or more reliable as phrase length goes up. This is because there is more data to choose from and thus the mini-rhythms can be chosen from the most deeply learned passages, i.e. those with the tightest mini-rhythms.

The impact of these techniques on the high-security problem is huge. Mini-rhythms allow security systems to create very small "windows" to be tested. It is known that the real user can "hit" these small mini-rhythm windows because this is the definition of a mini-rhythm in the first place. The "real" user can have all kinds of variation in typing patterns because real users do have variations outside of the mini-rhythms.

This kind of normal variation does not matter at all because the security technology of the invention only looks at certain, very small regions of known low variation in the typing patterns, which we call mini-rhythms. Our "real" user needs only be predictable regarding a few keystrokes of a selected phrase. An imposter, on the other hand, will need to hit every keystroke's flight and dwell time precisely. This is because he/she will have no idea where the mini-rhythms used in the security sequence are. In fact, even the "real" user has no idea which character groups form mini-rhythms for him/her. As we tighten the mini-rhythm windows, and lengthen the phrase, it quickly becomes impossible for an imposter to successfully mimic the real user. It is rather like a dance. The real user need only do a few "signature" moves precisely while the imposter needs to hit them all.

In measuring mini-rhythms, two events are typically evaluated, the key-down event and the key-up event. Their timing is noted. Other keystroke characteristics could also be sensed, recorded, and utilized, such as the physical key depressed, keystroke pressure, special key use, or other measurements. From this information, the variables are computed that will go into a mini-rhythm evaluation array.

Each time the subject types in the sample text, one row of data is created that captures the keystroke characteristics across the entire phrase. FIG. 1 illustrates this action and shows the subject entering the characters "T" and "I." The arrow 12 shows that time is passing beginning at block 14. When the "T" is depressed at block 14, Time Zero (T0) is noted. For simplicity, we show this as a value in milliseconds while in practice we can actually capture times with microsecond, or faster, resolution. When the "T" key is released at block 16, Time One (T1) is noted directly below. The difference between T0 and T1 is the Dwell Time 18 for this character of the sample text. When the "I" is depressed at block 20, Time Two (T2) is noted. The difference between T2 and T1 is the Flight time 22. When the "I" key is released at block 24, Time Three (T3) is noted directly below. The difference between T2 and T3 is the dwell time 26 for this character of the sample text. The Dwell and Flight times are stored as a record. This sequence of analysis continues for each character of the sample text.

Carrying this example further, we get a series of variables for the full phrase. For instance, the phrase "TIGERISAGOLFER":

memory that the unique mini-rhythms are developed. Indeed, they are the "way" a person remembers.

There is natural variability in everyone's rhythms. In the first part of the preferred mini-rhythm algorithm (the Learning and Enrollment stages), mini-rhythms with low variability will be identified, or said more rigorously those with small $\sigma$ (standard deviation) will be identified. The preferred sample text is one of sufficient length such that it will contain five, six, or more qualifying mini-rhythms. This translates into about nine to fifteen characters for most people. In a high security application, fifteen or more are used as the sample text length. This minimum length presents major challenges to an imposter. This is because the mini-rhythms could be anywhere. The imposter does not know where to look and therefore must try to emulate them all, each keystroke, dwell time, and flight time of each character. The longer the phrase, the harder this is. In addition, "phrase hardening" requirements are typically implemented. For instance, there should be few repeating letters/numbers/sequences that could simplify the required typing behavior we seek, and thus aid mimicry.

Ideally, it is desirable to use a phrase that is easy to remember, but one that would ordinarily not be typed as the sample text. Here are some examples of good sample texts:

tigerwoodsisagolfer tigerwoodsisthebestgolfer tigerwoodsisthebestgolferinthepga nowisthetimeforall All manner of flourishes can add complexity. For example, in "TigerWoodsIsTheBestGolfer," the Shift key depression could be timed, and which (left or right) Shift key the subject picked could be sensed. Use of ALT, CTRL, and spacebar, or indeed any special keys work as well.

It should be noted that flourishes are mostly in the domain of "hardening" the password value of the phrase itself. The fundamental mini-rhythm layer is a separate function. It looks at the "Fist of the Sender" not the message per se. That said, the flourishes also have mini-rhythms.

The idea of mini-rhythm validation is to add a biometric check to the password layer. The mini-rhythm layer becomes a membrane residing behind the password. Moreover, it is an invisible membrane as well.

| T | → | I | → | G | → | E | → | R | → | I | → | S | → | A | → | G | → | O | → | L | → | F | → | E | → | R |
|---|---|---|---|---|---|---|---|---|---|---|---|---|---|---|---|---|---|---|---|---|---|---|---|---|---|---|
| D | F | D | F | D | F | D | F | D | F | D | F | D | F | D | F | D | F | D | F | D | F | D | F | D | F | D |

The Dwell and Flight times (D&F) for this phrase form the record shown in FIG. 2. In block 28, a particular sample number of an execution of the sample text is listed. Block 30 shows the first dwell time for the sample text. Block 32 shows the first flight time for the sample text, and blocks 34 and 36 continue this pattern for as many places as the sample text requires. Block 38 shows the last entry for the sample text, which is the dwell time on the last character of the sample text. Thus the dwell time at block 30 equals T1–T0, the flight time at block 32 equals T2–T1, the dwell time at block 34 equals T3–T2, and so on.

In order to be useful, the sample text must be completely "learned" by the subject. This means they must be able to type it without thinking. It must be a matter of "memory." It is with The Learning Phase In order for mini-rhythms to function, the subject must have "learned" the sample text. Learning is defined as complete when the subject exhibits mini-rhythms equal to or exceeding specified minimum qualifiers when repeatedly typing the sample text in a structured environment. In other words, the subject must exhibit the development of mini-rhythms to exit the learning phase.

The subject enters the sample text and the dwell and flight times for each key are computed. This information makes one record in the mini-rhythm array, as shown in FIG. 2.

An example of a sample text could be "tigerwoodsisagolfer." The timings for the keystroke characteristics are stored as a row, or record. In this case, there are thirty-seven variables (tigerwoodsisagolfer is nineteen characters long, and each character has dwell and flight except the first and last characters). The formula is Array=(N*2)−1, or (19*2)−1=37.

The "Enter" key terminates typing and indicates if the sample is valid. Note this can be any terminating key. If the subject hits a "correction" key, like the Backspace or Esc keys, the entire sample is rejected. Each sample process must run uninterrupted.

It is a requirement of the system that the subject give good samples. Subjects, under some circumstances, might try to defeat the system. One simple way to defeat the entire prior art of keystroke recognition is to simply give bad samples on purpose. By giving samples with high variability, a subject could cause prior art to create a bogus signature and one so weak that it would "recognize" virtually anyone typing anything even remotely close to the bogus signature samples. In the present system, if the subject does not provide good samples, the subject never exits the learning phase. The present system requires the presence of stable mini-rhythms across a significant sample base before any samples are "accepted, which is necessary to ensure the mini-rhythm signatures are tight, and to guard against the subject attempting to bias the mini-rhythms via phony variability. It is presumed that during the learning phase, and the subsequent enrollment phase, the subject has been positively identified. Obviously, "imposters" cannot be allowed to enroll.

The next step "seeks" mini-rhythms with high, predictive quality. This is accomplished by building the mini-rhythm array: The subject enters the sample text, hits the Enter key, then re-enters the sample text again, and hits the Enter key again. Each successive sample is a record, or row, in the mini-rhythm array. The mini-rhythm array is shown in FIG. 3.

After a few records, the system can begin to calculate the variables used by the mini-rhythm criteria and "seek" qualifying mini-rhythms. First, the mean (M) and standard deviation (σ) for each column are computed. Next, σ in terms of M is calculated, which is a measure of variance. The timing array within each column conforms reasonably to a normal distribution. A good distribution will be a bell curve with very steep sides on the central peak.

FIGS. 4A and 4B show graphical displays of possible data for a particular column in the array, representing data on the dwell or flight time of that column. The required statistical relevance of the data can be specified by the user, and one convenient way to do this is by looking at standard deviation in terms of the mean. If there is a large amount of variability in the samples recorded for any particular column, the data will appear more like the curve of FIG. 4A. When mini-rhythms are present, the times will be tightly grouped around the mean and the data will appear more like the curve of FIG. 4B. Data that appears more like FIG. 4B is more consistent in the enrollment phase, easier for the real user to repeat later, and will be harder for an imposter to duplicate in the verification phase. The mini-rhythm criteria essentially defines how steep the curves in FIG. 4B must be to qualify variables, or variable groupings, as sufficiently learned and repeatable for use as a mini-rhythm.

FIG. 5 takes the array of FIG. 3 one step further. At block 40, the mean of 90 milliseconds is recorded as an example of the mean dwell time for the dwell times in that column (again and throughout, milliseconds are used for convenience and in practice, microsecond or faster timings are used). At block 42, the mean flight time for that column is shown. The means for the other columns are similarly calculated. At block 44, the standard deviation of the data in the column is shown. In block 46, an evaluation of whether the figure in block 44 meets example acceptance criteria is presented. By reading the results shown in row 48, it can be seen how many mini-rhythms were satisfactory entered. The number of mini-rhythms identified in the sample set is compared to the minimum number of mini-rhythms required for enrollment acceptance. If sufficient mini-rhythms exist in the array, the user may exit enrollment successfully.

FIG. 6 is a table that shows example criterion for verifying a user in the verification phase. Each row has information about a particular entry of the sample text. For instance, row 50 shows data for the flight time of a "G" character entered with the sample text. Block 52 shows the mean of the entries of this character from the previous enrollment phase entries. In this case, the mean flight time for "G" is 180 milliseconds. Block 54 shows the standard deviation of the enrollment phase entries. In this example, the standard deviation is shown as 8 ms. In block 56, the flight time of the example actual verification entry is 162 ms. In block 58, the number of standard deviations for this verification entry is calculated as 2.25 standard deviations. The criterion for acceptance of the verification entry is listed in block 60. The criterion for acceptance in this example is 3 standard deviations, so the verification sample meets that requirement. The result of the comparison is shown in block 62, as a yes. For any particular verification text, there will be a number of mini-rhythms present. For instance, a twenty character phrase might yield twelve mini-rhythms (out of the thirty-nine possible Dwell/Flight variables), which would correspond with 12 rows in a table such as that in FIG. 6. Depending on other statistical qualifiers, the subject would normally have a certain number of acceptable mini-rhythms present, such as ten to twelve. Other ranges of acceptable mini-rhythms, such as six to nine or zero to five, might be used to trigger certain actions such as to reenter the verification text, or to signal a monitor to observe the subject.

During enrollment, the subject can typically achieve a very narrow grouping of times for each mini-rhythm, with small absolute time windows. Both are important qualifiers. One way mini-rhythms are qualified is by looking at how many times σ can fit within +/−QM% of M (QM=qualifying margin). For instance, if a subject had submitted enrollment sample values that calculated to M=150 ms and σ=5 ms, and if +/−10% was chosen as the QM goal, 3σ fits into our 10% margin (150*0.10=15, 15/5=3). Said another way, our subject will normally be within 10% of M in about 99 out of 100 attempts. Thus, a mini-rhythm defined. A typical user typing naturally will be within the mini-rhythm defined range of acceptable results without effort. Mini-rhythms are highly tunable.

Mini-rhythm qualification has three main "tunable" parameters. These are discussed below. Note: Timings are shown in milliseconds for ease of reading and clarity. In practice, timing resolutions of a microsecond, or finer, are used.

The plus/minus (+/−) distance from M within which σ fits are counted and referred to here as the Qualifying Margin (QM), which is a percentage. In the above example, 10% was used on either side of M, equating to QM=5 ms for our example of M=150 ms. Raising this number makes it easier for the subject to qualify a mini-rhythm because it allows for more variability. Raising this number also shortens the learning process. Tightening this number has the reverse effect. It requires deeper learning from the subject, meaning more repetitions. However, it also "tightens" the mini-rhythm as an intruder-detection metric.

The number of fits is the number of times σ in milliseconds goes into the QM in milliseconds. Therefore, if the QM=50 ms+/−for a given variable, and σ=10 ms, then NF=5. Said another way, 5σ or 99.9999% of the time, a subject qualifying at NF=5 will repeat the mini-rhythm behavior with a time that conforms to within +/−50 ms (5σ) or a total variance of 100 ms.

Raising the NF required for qualification has some interesting, and subtle, effects. First, raising the NF will increase the required learning effort for the subject. However, raising the NF actually makes it easier for the subject on subsequent verifications. The reason is, by definition, the higher the NF required, the more often the subject will actually be able to "do" the behavior. In other words, a mini-rhythm that is present to 5σ is something deeply ingrained in the subject. This is a very highly learned behavior and highly trustable. The subject "does" this. The higher the NF within a given QM, the more useful mini-rhythms are as biometric indicators. Therefore, the higher the security desired, the higher the NF should be. One σ accounts for 68% of the subject's mini-rhythm variability. Two σ accounts for 95% and 3 σ for 99%. Four σ and five σ take it to about 99.99% and 99.9999%, respectively. At NF=6, our subject will hit within the QM 999,997 out of 1,000,000 times and has "Six Sigma" mini-rhythms. In most cases, a NF of two or three will suffice.

Qualifying variables (QV) (dwell and flight) is the number of mini-rhythms that must be present to generate a valid signature, thus they must equal (or exceed) the selected values of QM and NF. To be useful, QV should be set to at least three, with five or more preferable. In a high security environment where QM and NF are set and require deep learning, and phrase length is set to fifteen to twenty characters or more, it is not uncommon to see twelve or more variables that meet the QM/NF criteria. QV is the minimum that must be met. During the enrollment phase, the subject must continue to enter samples (type the sample text) until at least the QV has mini-rhythms that meet the qualification criteria. Earlier the phrase "tigerwoodsisthebestgolfer" was used. In that example, setting QV=6 means that 6 out of the 49 possible variables must pass the QMINF test. Note: it can be any six. This is interesting because even the subject will not be aware of "which" six mini-rhythms our algorithm is using. There is nothing for them to "try" to do. They just type. conversely, and the prospective imposter also has no idea. Therefore, the imposter must attempt to hit all forty-nine variables to within QM/NF tolerance. Another complication for the prospective imposter is the fact that the real subjects themselves do not hit all forty-nine mini-rhythms on the nose. They only hit some of them, and the tolerances are tight. Casual eavesdropping is likely misleading.

As mentioned earlier, mini-rhythms are useful as "warning bells." If the real subject misses one or two mini-rhythms in a subsequent verify process, maybe that is ok. If the real user misses three, that is very unusual. If the user misses four or five or more, something is definitely wrong. Either the subject is an imposter and an intrusion-attempt in-progress, or something is wrong (as in psychologically or physically) with the user. As a performance measure, mini-rhythms are capable of remotely detecting mind-altering substance use or potentially stress and mood changes. With respect to intrusion, they offer the prospect of real-time and covert alerts.

The Optional Learning Phase

For most people, it will take ten to twenty "practice" attempts before their mini-rhythms form and settle. Some people may need more practice efforts. It depends on the subject, the degree of learning required, and if the invested time is contiguous. The subject can rest during this process, stop, and later resume. Indeed this is desirable to combat fatigue.

A "Learning" mode can be used to monitor the practice typing for the emergence of mini-rhythms. It is useful to give the user feedback on learning progress and to alert them when learning has succeeded.

Learning is successful when at least QV variables are found that equal or exceed the QM and NF parameters across a small number of the most recent samples, where the last five samples given are as an example. Five samples is not a statistically valid sample size, but seeing QV across five samples in a row is enough to indicate learning.

The process can be given another measurable attribute by looking at learning curves as well. As long as the subject is improving σ on some variables, it is reasonable to allow the "learning" phase to continue past QV variables, and/or the QM and NF goals within QV. In other words, it is desirable for the σ to settle to as low a number as possible, on as many variables as possible.

An option is to give the subject running feedback during the learning process to let them know how they are doing, and perhaps estimate how much more time, or how many more samples, will be required for success.

Once learning successfully concludes, the subject can go on into the mini-rhythm enrollment phase.

The Enrollment Phase

Although the number can be smaller, in order to be statistically rigorous, a minimum number of samples are included in the mini-rhythm array. Usually, the minimum is set to thirty, although it could be as few as ten and as many as 100 or more. The sample pool must yield at least QV variables that equal or exceed the QM and NF parameters selected. When these are present, the mini-rhythm enrollment phase is complete.

Like the Learning Phase, the subject is asked to type the chosen sample text repeatedly. The subject is advised of exactly what he is doing, and what he needs to do to succeed in generating a valid mini-rhythm signature. Again, the patterns must be stable across the full minimum sample pool. Since the subject has succeeded in learning, it is known that the subject "can" do the behaviors. Therefore, while the subject is making samples for mini-rhythm signatures, the system needs to be sensitive to any outliers the subject presents. Some subjects will get tired. Some will "try" too hard. Some will get cute. Some will try to defraud the system.

One way that a subject may try to defeat the system is to vary their keystroke rhythms during the enrollment phase. The thinking is that the greater the variability in the profile, the easier it will be to "break" it later. This is exactly why this is not allowed. The subject has to hit the mini-rhythm targets or they never successfully create a signature and never exit the mini-rhythm Enrollment Phase. In this respect, the Enrollment Phase is like the Learning Phase—the only exit is success, defined as mini-rhythms that meet or exceed the system's criteria. False signatures are never allowed.

To deal with the cases of bad samples mid-process (honest subjects), and fully false data (dishonest subjects), an array of computed M and σ historical values, in addition to the timings, is kept. From this array we compute learning curves. A normal person doing an honest sample set will experience a learning curve. The values for σ will fall. If this does not happen, or if it was happening and is now not, there is some problem. In the first case, it is probable that the subject is not responding honestly. In the second case, it is likely that the subject was distracted in some way, particularly if it is a one-sample blip.

If an outlier is observed, it can be eliminated from the calculations. This can be caused by the occasional interruption or distraction. The subject can also be advised of the problem and a brief rest taken. With large-scale testing, optimal rest intervals and the most effective subject feedback can be determined. If an unstable pattern or an intermittent problem is observed, the subject may be impaired or being less than forthright. The subject can also be advised of this.

Generally speaking, the subjects correct their own outliers. This is because they have a "correction" key or keys such as, the Backspace or Esc keys. If they make mistakes in a rhythm because of fatigue or distraction, or any reason, they can hit the correction key to discard the entire sample and start over again. In this way, hitting the "Enter" key is a proactive statement on the subject's part that the sample just keyed is "good".

In any event, the mini-rhythm Enrollment Phase lasts until the subject successfully provides samples demonstrating reliable mini-rhythms to within the established tolerances across a number of samples equal to the minimum sample pool size chosen.

Once the Enrollment Phase has concluded, the mini-rhythms should be well established for a considerable period of time, particularly if the subject has some opportunity to re-exhibit their learned mini-rhythms. If extended time passes, or if the subject has some major physical change, they may need to perform the Learning and/or Enrollment Phase(s) again. In the worst case, the subject can re-learn and re-enroll from scratch, which is not difficult to do.

Recognizing People Via Mini-Rhythms: Verification

After the Enrollment Phase, a subject's identity can be confirmed using a Verification Phase. For verification, the subject types in the enrollment text. The keystroke event times are compared to the mini-rhythms in the stored signature data.

For each mini-rhythm in the enrolled signature, the stored M and σ values are compared to the time measured in the current sample. An example of this comparison is shown in FIG. 6.

A subject can normally and easily type in his/her sample text and get all "greens." However, sometimes he/she will make a mistake and it is also possible that he/she will miss them all if they are not "normal." A subject could be under heavy stress, physically ill, or intoxicated, wherein he/she will not give a "normal" performance.

However, the statistics are extremely reliable for an authentic subject. If, for example, the subject exhibits five mini-rhythms with QM=20 and NF=2, this means, for each mini-rhythm, the subject is within 20% of the Mean 95% of the time. Said another way, the subject misses 5% of the time when in a normal mental and physical state. Since a "normal" miss on one mini-rhythm can be considered to be unrelated to a miss on any other mini-rhythm, we can use the multiplicative rule. This yields 5% times 5% or 0.25% chance of missing two. The probability of missing three, four, or five mini-rhythms are similarly calculated, and result in extremely low probabilities. However, if a user is affected by drugs, the condition precedent affects these keystrokes and different statistics apply. As noted, physical illness and even stress can affect timings.

If the system senses a number of "red" lights, the user is likely to be an intruder. Said differently, each missed mini-rhythm increases the real-time risk of an intrusion in-progress. The system can then take the appropriate steps with actions depending of the "degree of risk" measured by the number of missed mini-rhythms.

While there is shown and described the present preferred embodiment of the invention, it is to be distinctly understood that this invention is not limited thereto but may be variously embodied to practice within the scope of the following claims.

We claim:

1. A method of providing security to keyboard based systems, by recognizing patterns of typing by a subject for identity confirmation, comprising:

defining at least one statistical relevance criterion that will qualify certain keystrokes in a group of keystrokes typed by a subject as a mini-rhythm;

defining at least one enrollment phase criterion to indicate when text entered in an enrollment phase qualifies as meeting enrollment phase requirements;

requiring a subject to enter an enrollment phase, in which subject enters sample text at a keyboard;

sensing characteristics of sample text keystroke actions made when subject enters the sample text;

storing a plurality of sample text keystroke characteristic data in memory;

analyzing the plurality of sample text keystroke characteristic data against the statistical relevance criteria to identify if one or more groupings of sample text keystroke actions qualifies as a mini-rhythm and selectively using only mini-rhythm data from the sample text;

analyzing the mini-rhythm data to verify that the enrollment phase criteria have been met;

storing the mini-rhythms in memory as identified mini-rhythms unique to the subject;

defining at least one criterion for acceptance of validation mini-rhythm recognition;

building a mini-rhythm array comprised of a plurality of records, in which each record in the array is comprised of dwell and flight times of the characters in the sample text, and the records form columns, with each column being flight or dwell times for the same character in the sample text, from different entries of the sample text; and allowing the subject access to the keyboard-based system based on the mini-rhythm array.

2. The method of providing security to keyboard based systems of claim 1, in which the at least one statistical relevance criterion is defining the number of qualified mini-rhythms required to constitute a valid enrollment.

3. The method of providing security to keyboard based systems of claim 1, in which the at least one statistical relevance criterion is defining the number of samples across which the mini-rhythms must be present.

4. The method of providing security to keyboard based systems of claim 1, which further comprises:

analyzing data in each column of the mini-rhythm array for mean and standard deviation.

5. The method of providing security to keyboard based systems of claim 1, which further comprises:

requiring the subject to enter sample text during the enrollment phase which comprises sufficient text to enable determination of a required number of mini-rhythms.

6. The method of providing security to keyboard based systems of claim 1, which further comprises:

entering validation text, which may be different than the sample text.

7. The method of providing security to keyboard based systems of claim 1, which further comprises:

entering sample text which comprises a selected series of words, and later requiring the subject to enter the validation text which is the same selected series of words as the sample text.

8. A method of providing security to keyboard based systems, by recognizing patterns of typing by a subject for identity confirmation, comprising:
- defining at least one statistical relevance criterion that will qualify certain keystrokes in a group of keystrokes typed by a subject as a mini-rhythm;
- defining at least one enrollment phase criterion to indicate when text entered in an enrollment phase qualifies as meeting enrollment phase requirements;
- requiring a subject to enter the enrollment phase, in which the subject enters sample text at a keyboard;
- sensing characteristics of sample text keystroke actions made when subject enters the sample text;
- analyzing the plurality of sample text keystroke characteristic data against the statistical relevance criteria to identify if one or more groupings of sample text keystroke actions qualifies as a mini-rhythm, and to evaluate if the sample text meets the enrollment phase requirements criteria and selectively using only mini-rhythm data from the sample text;
- storing a plurality of sample text keystroke characteristic data in memory as identified mini-rhythms;
- defining criteria for acceptance of validation mini-rhythm recognition; and
- building a mini-rhythm array comprised of a plurality of records, in which each record in the array is comprised of dwell and flight times of the characters in the sample text, and the records form columns, with each column being flight or dwell times for the same character in the sample text, from different entries of the sample text; and
- allowing the subject access to the keyboard-based system based on the mini-rhythm array.

9. The method of providing security to keyboard based systems of claim 8, which further comprises:
- sensing key up, key down, dwell time and flight time characteristics of keystroke actions performed by the subject when entering text.

10. The method of providing security to keyboard based systems of claim 8, which further comprises:
- signaling an end of sample text entry when the subject presses an enter key.

11. The method of providing security to keyboard based systems of claim 10, which further comprises:
- analyzing data in each column of the mini-rhythm array for mean and standard deviation.

12. The method of providing security to keyboard based systems of claim 8, which further comprises:
- allowing the user to define the sample text.

13. The method of providing security to keyboard based systems of claim 12, which further comprises:
- including non-alphanumeric key use in the sample text.

14. The method of providing security to keyboard based systems of claim 12, which further comprises:
- selecting a sample text of greater than 9 characters.

15. The method of providing security to keyboard based systems of claim 12, which further comprises:
- selecting a sample text of 9 to 50 characters.

16. The method of providing security to keyboard based systems of claim 12, which further comprises:
- selecting a sample text of 15 or more characters.

17. The method of providing security to keyboard based systems of claim 12, which further comprises:
- using a predetermined qualifying margin as a statistical relevance criteria for qualifying certain keystrokes in a group of keystrokes typed by a subject as a mini-rhythm.

18. The method of providing security to keyboard based systems of claim 8, which further comprises:
- using a predetermined number of fits criterion as a statistical relevance criteria for qualifying the minimum number of identified mini-rhythms required.

19. The method of providing security to keyboard based systems of claim 8, which further comprises:
- using a predetermined number of qualifying variables as an enrollment phase criterion to qualify an enrollment phase as accepted.

20. A method of providing security to keyboard based systems, by recognizing patterns of typing by a subject for identity confirmation, comprising:
- defining at least one statistical relevance criterion that will qualify certain keystrokes in a group of keystrokes typed by a subject as a mini-rhythm;
- defining at least one criterion to indicate when text entered in an enrollment phase qualifies as meeting enrollment phase requirements;
- requiring a subject to enter the enrollment phase, in which the subject enters sample text comprising 9 to 50 characters at a keyboard, and sensing key up, key down, dwell time and flight time characteristics of keystroke actions performed by the subject made when subject enters the sample text and ending the sample text entry when the subject presses an enter key;
- storing a plurality of sample text keystroke characteristic data in memory;
- analyzing the plurality of sample text keystroke characteristic data against the statistical relevance criteria to identify if one or more groupings of two or more sample text keystroke actions qualifies as a mini-rhythm;
- building a mini-rhythm array comprised of a plurality of records, in which each record in the array is comprised of dwell and flight times of the characters in the sample text, and the records form columns, with each column being flight or dwell times for the same character in the sample text, from different entries of the sample text;
- analyzing data in each column of the mini-rhythm array for mean and standard deviation against the enrollment phase criteria to identify valid enrollment phase mini-rhythms;
- storing the valid enrollment phase mini-rhythms in memory or on computer readable memory as identified mini-rhythms unique to the subject, for later comparison with subsequent validation phase mini-rhythms; and
- allowing the subject access to the keyboard-based system based on the mini-rhythm array.

21. A method for providing security to keyboard based systems, by recognizing patterns of typing by a subject for identity confirmation, comprising:
- defining at least one statistical relevance criterion for use in evaluating for the presence of one or more mini-rhythm in a group of keystrokes typed by a subject as a sample text;
- defining at least one enrollment phase criterion for evaluating text entered in the sample text;
- enrolling the subject, in which the subject enters the sample text at a keyboard, and characteristics of sample text keystroke actions are sensed when subject enters the sample text;
- storing a plurality of sample text keystroke characteristic data are stored in memory;
- sample text analyzing in which the plurality of sample text keystroke characteristic data against the statistical relevance criteria to identify if one or more groupings of two or more sample text keystroke actions qualifies as a mini-rhythm, with mini-rhythm data being selectively used for subsequent operations;

analyzing the mini-rhythm data against the enrollment phase criteria to determine if the requirements of the enrollment phase have been met;

storing the mini-rhythms in memory as identified mini-rhythms unique to the subject;

defining at least one criterion for acceptance of validation mini-rhythm recognition; and defining a mini-rhythm array in computer memory, the mini-rhythm array comprised of a plurality of records, in which each record in the array is comprised of dwell and flight times of the characters in the sample text, and the records form columns, with each column being flight or dwell times for the same character in the sample text, from different entries of the sample text; and allowing the subject access to the keyboard-based system based on the mini-rhythm array.

22. The method of claim 21, in which the defining at least one statistical relevance criterion comprises:
    defining the number of qualified mini-rhythms required to constitute a valid enrollment.

23. The method of claim 21, in which the defining at least one statistical relevance criterion comprises defining the number of samples in which the mini-rhythms must be present.

24. The method of claim 23, which further comprises analyzing data in each column of the mini-rhythm array for mean and standard deviation.

25. The method of claim 21, in which the sample text analyzing comprises analyzing sufficient text to enable identification of a required number of mini-rhythms.

\* \* \* \* \*